C. M. FAHNESTOCK.
RECEPTACLE FOR RETAINING OR EXCLUDING HEAT.
APPLICATION FILED DEC. 2, 1918.
1,315,624.
Patented Sept. 9, 1919.
FIG. 2.
FIG. 1.
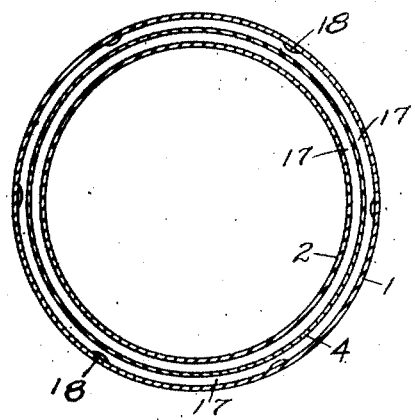
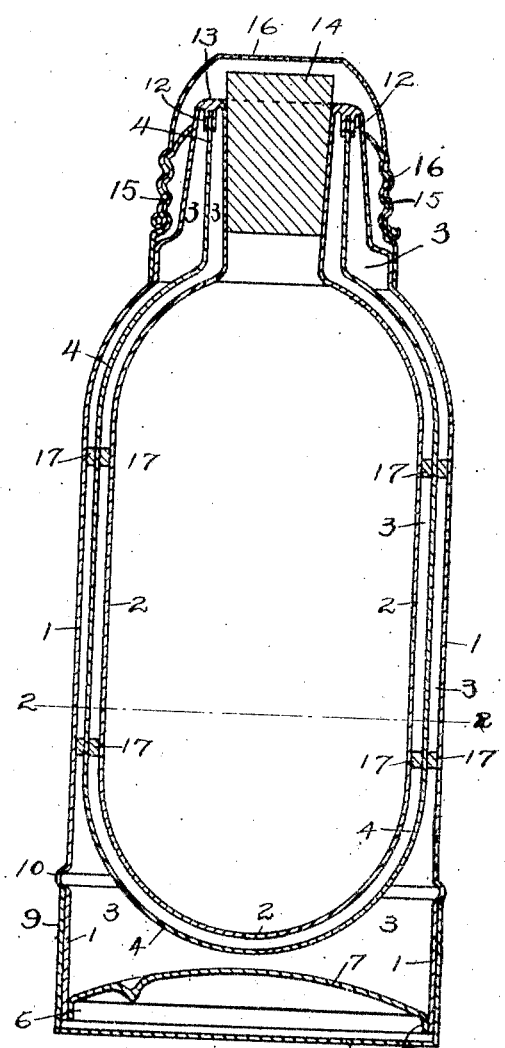
INVENTOR
Charles M. Fahnestock
by John W. Strebli
ATTORNEY

UNITED STATES PATENT OFFICE.

CHARLES M. FAHNESTOCK, OF CINCINNATI, OHIO, ASSIGNOR, BY DIRECT AND MESNE ASSIGNMENTS, TO CHARLES M. FAHNESTOCK, TRUSTEE, OF CINCINNATI, OHIO.

RECEPTACLE FOR RETAINING OR EXCLUDING HEAT.

1,315,624. Specification of Letters Patent. Patented Sept. 9, 1919.

Application filed December 2, 1918. Serial No. 265,032.

*To all whom it may concern:*

Be it known that I, CHARLES M. FAHNESTOCK, a citizen of the United States, residing in the city of Cincinnati, in the county of Hamilton and State of Ohio, have invented certain new and useful Improvements in Receptacles for Retaining or Excluding Heat, of which the following is a specification.

My invention belongs to that class of receptacles known as "vacuum bottles," which are intended to retain or exclude heat, and thus retain the contents at a higher or lower temperature than the surrounding atmosphere.

My improved receptacle is cheap of manufacture, simple in construction and highly efficient in use. It is unique and sanitary, and possesses a marked degree of utility.

My invention consists essentially in providing an inner and an outer bottle or shell spaced apart, the space between the shells forming a vacuum, so that the container or inner shell is vacuum insulated, thus the contents placed in the container will remain at or preserve the temperature at which they have been placed therein for a considerable time.

One of the main objects of my invention is to place a shell or partition of asbestos or other refractory material of a low degree of conductivity in the vacuum space, thus the heat will not radiate to any extent and such radiation will be cut to a minimum; thus the contents of the container or inner bottle or shell will be maintained at the desired temperature for a maximum period of time.

Other features of the invention and advantageous elements of construction and detail, will become apparent from the following specification and claims.

In the accompanying drawing, forming part of this specification:

Figure 1, is a central longitudinal section of my improved receptacle, and

Fig. 2, is a cross section on the line 2—2 of Fig. 1.

The outer shell or wall is marked 1 and the inner shell or wall 2; this shell 2 forms the container. Between these two shells 1 and 2, I form a vacuum space 3, and in this vacuum I place the refractory shell 4. This refractory shell 4 may be placed at any part in the vacuum space, but is generally and preferably placed so that it will divide said space, so that a divided vacuum space will be present at each side of the said refractory shell, thus providing a double insulation from the inside and outside of the receptacle.

At the bottom the vacuum space 3 is larger and at this bottom part the outer shell 1 and the cylindrical edge 6 of a cap piece 7, and can be properly welded together to hold the vacuum. The whole bottom part is inclosed by a retaining cap 9 which fits thereon and extends up to a point 10 in the shell 1, and it may be held in position in any manner. At the top the shells 1 and 2 and the refractory piece 3 are bent to form a neck as shown. The top ends of shells 1 and 2 are bent down as shown at 12 to hold the top edge of the refractory piece 3 between them and are welded at 13 to hold the vacuum.

A stopper 14 is shown in the container. Around the neck part of the bottle I attach in any suitable manner a partly screw threaded cap piece 15 and onto this screw thread piece 15 I screw the screw threaded removable top cap 16.

The refractory piece 4 is held in a desired normal position by the rings 17 which keep it evenly spaced from the shells 1 and 2 as shown. I preferably leave a series of communicating spaces 18 in the rings 17, (see Fig. 2).

The inner container formed by wall or shell 2 may be made of any contour and out of any material, preferably thin metal and the outer shell 1 and its connecting parts may be of metal or other material and of any desired contour. The refractory material 4 may be placed in the vacuum space 3 in any desired manner and may be of any material of this character best suited for the purpose and may be held in normal position in any desired manner.

While I have described one specific form of carrying my invention into effect, I do not desire to limit myself to such specific construction, as the same may be modified to some extent and I wish to be understood as not limiting myself to such specific construction.

What I claim as new and my invention, and desire to secure by Letters Patent is:

1. In a receptacle of the class described, an inner member and an outer member, spaced to form a vacuum between them, and a longitudinally disposed partition in said space dividing the same, said partition made of a sheet of refractory material of low conductivity.

2. A receptacle of the class described, formed of three single walls, an inner wall and an outer wall and a partition wall between them, said walls vacuum spaced from each other, the partition wall formed of a refractory material of low conductivity.

3. A receptacle of the class described, formed of three single walls, an inner wall and an outer wall and a partition wall between them, said walls spaced from each other, the partition wall formed of a refractory material of low conductivity, the said three walls extending and spaced the the entire length of the receptacle, all the spaces between said walls formed of a vacuum.

4. In a receptacle of the class described, an inner and an outer member, both made of thin metal and spaced apart to form a vacuum, and a single sheet wall made of a material of low conductivity, dividing the vacuum space between the members.

5. In a receptacle of the class described, an inner member and an outer member, spaced to form a vacuum heat insulating space between them, and a sheet of asbestos surrounding the inner member, but spaced therefrom.

6. A receptacle including an inner shell, an outer shell spaced at all points from said inner shell and separated therefrom by a vacuum space, and a partition of sheet material of low conductivity arranged in said vacuum space and spaced at all points from said inner and outer shells whereby to divide said space into inner and outer vacuum chambers and to resist a transfer of heat between said chambers.

7. A receptacle including an inner shell of thin metal adapted to receive the contents of the receptacle, an outer shell also of thin metal spaced throughout from the inner shell, said inner and outer inclosing an evacuated space, and a partition of asbestos arranged in and dividing said evacuated space, said partition spaced throughout from both the inner and outer shells.

In testimony whereof, I affix my signature.

CHARLES M. FAHNESTOCK.

Witnesses:
H. E. CARSTENS,
JOHN W. STREHLI.